United States Patent
Ono et al.

(10) Patent No.: US 12,377,735 B2
(45) Date of Patent: Aug. 5, 2025

(54) WORK VEHICLE

(71) Applicant: Kubota Corporation, Osaka (JP)

(72) Inventors: Kohei Ono, Sakai (JP); Takashi Nagayama, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/372,449

(22) Filed: Sep. 25, 2023

(65) Prior Publication Data

US 2024/0100967 A1 Mar. 28, 2024

(30) Foreign Application Priority Data

Sep. 26, 2022 (JP) ................................ 2022-152768

(51) Int. Cl.
| | |
|---|---|
| *B60L 50/60* | (2019.01) |
| *B60K 1/00* | (2006.01) |
| *B60K 17/04* | (2006.01) |
| *B60K 17/28* | (2006.01) |
| *B62D 49/06* | (2006.01) |

(52) U.S. Cl.
CPC ................ *B60L 50/60* (2019.02); *B60K 1/00* (2013.01); *B60K 17/04* (2013.01); *B60K 17/28* (2013.01); *B60L 2200/40* (2013.01); *B62D 49/0671* (2013.01)

(58) Field of Classification Search
CPC . B60L 2200/40; B60L 50/60; B62D 49/0671; B60Y 2200/221; B60Y 2200/223; B60Y 2400/61; B60K 1/00; B60K 17/04; B60K 17/28; B60K 17/22
See application file for complete search history.

(56) References Cited

U.S. PATENT DOCUMENTS 3,307,431 A * 3/1967 Hungerford ......... B62D 53/025
74/15.84
11,413,960 B2  8/2022 Bindl et al.
(Continued)

FOREIGN PATENT DOCUMENTS

CN  114194012 A  *  3/2022
EP    3987902 A1     4/2022
(Continued)

OTHER PUBLICATIONS

Hayashi , Work Machine, Jul. 24, 2014, EPO, JP 2014133438 A, Machine Translation of Description (Year: 2014).*

(Continued)

*Primary Examiner* — Paul N Dickson
*Assistant Examiner* — Matthew D Lee
(74) *Attorney, Agent, or Firm* — The Webb Law Firm

(57) ABSTRACT

A work vehicle includes travel devices; a battery; a motor; an inverter configured to operate the motor; an operation section including a steering wheel configured to operate the travel devices, and an operator seat; a transmission case housing a transmission for travel; and a transmission shaft, wherein the motor is between a front travel device and a rear travel device in a side view and below the steering wheel, and the motor, the transmission shaft, the transmission, and the travel devices are configured such that motive power from the motor is transmitted to the transmission via the transmission shaft and transmitted from the transmission to the travel devices.

4 Claims, 8 Drawing Sheets

(56) References Cited

U.S. PATENT DOCUMENTS

| | | | |
|---|---|---|---|
| 2011/0108336 A1* | 5/2011 | Takeda | B60K 1/00 |
| | | | 180/62 |
| 2019/0000012 A1* | 1/2019 | Yagyu | A01C 19/02 |
| 2019/0200510 A1 | 7/2019 | Chrysanthakopoulos et al. | |
| 2019/0350121 A1* | 11/2019 | Yamaguchi | A01B 71/02 |
| 2020/0130693 A1* | 4/2020 | Yagyu | B60W 30/1888 |
| 2020/0398780 A1* | 12/2020 | Kobayashi | B60R 16/0215 |
| 2022/0276656 A1* | 9/2022 | Nishikubo | G01S 15/88 |
| 2023/0019714 A1* | 1/2023 | Takaki | B60K 15/07 |
| 2023/0286365 A1* | 9/2023 | Buhrke | B60K 17/12 |

FOREIGN PATENT DOCUMENTS

| | | | | |
|---|---|---|---|---|
| JP | 2004017934 A | * | 1/2004 | |
| JP | 2013141875 A | | 7/2013 | |
| JP | 2014133438 A | * | 7/2014 | B60Q 1/0483 |
| WO | WO-2020003892 A1 | * | 1/2020 | B60G 17/00 |
| WO | WO-2020261848 A1 | * | 12/2020 | A01B 63/1013 |

OTHER PUBLICATIONS

Hiraoka , Ridden Work Vehicle, Jan. 2, 2020, EPO, WO 2020003892 A1, Machine Translation of Description (Year: 2020).*
Daisuke, Electric Work Vehicle, Dec. 30, 2020, EPO, WO 2020261848 A1, Machine Translation of Description (Year: 2020).*
Hayashi , Work Machine, Jul. 24, 2014, EPO, JP 2014133438 A, Machine Translation of Description (Year: 2014).*
Hiraoka&nsp;, Ridden Work Vehicle, Jan. 2, 2020, EPO, WO 2020003892 A1, Machine Translation of Description (Year: 2020).*

\* cited by examiner

WORK VEHICLE

CROSS-REFERENCE TO RELATED APPLICATION

This application claims priority to Japanese Patent Application No. 2022-152768 filed Sep. 26, 2022, the disclosure of which is hereby incorporated by reference in its entirety.

BACKGROUND OF THE INVENTION

1. Field of the Invention

The present invention relates to an electric work vehicle in which a motor drives a travel device, and a hybrid work vehicle in which an engine and a motor drive a travel device.

2. Description of Related Art

JP 2013-141875A discloses an example of an electric work vehicle. JP 2013-141875A states that a transmission case that houses a transmission for travel is provided at a rear portion of the work vehicle, and a motor is joined to a front portion of the transmission case. Motive power from the motor is transmitted to the transmission, and is then transmitted from the transmission to front wheels (each of which corresponds to a travel device) and rear wheels (each of which corresponds to a travel device).

JP 2013-141875A discloses an example of related art.

In JP 2013-141875A, the motor, which is a heavy object, is located at the center of the work vehicle in the front-back direction, and the motor hardly affects the front-back balance of the work vehicle.

However, the weight of the work device is likely to change the front-back balance of the work vehicle since the work vehicle performs work travel with the work device supported by a front portion of the work vehicle or with the work device supported by a rear portion of the work vehicle.

SUMMARY OF THE INVENTION

The present invention aims to configure a work vehicle such that a motor, which is a heavy object, being provided at an appropriate position improves the front-back balance of the work vehicle with the work device supported by the work vehicle.

A work vehicle of the present invention includes: travel devices including a front travel device and a rear travel device; a battery; a motor; an inverter configured to operate the motor; an operation section including: a steering wheel configured to operate the travel devices, and an operator seat; a transmission case housing a transmission for travel; and a transmission shaft, wherein the motor is between the front travel device and the rear travel device in a side view and below the steering wheel, and the motor, the transmission shaft, the transmission, and the travel devices are configured such that motive power from the motor is transmitted to the transmission via the transmission shaft and transmitted from the transmission to the travel devices.

According to the present invention, the motor is located slightly forward of the center of the work vehicle in the front-back direction. This makes it easier for the motor to function as a balance weight while a work device having a relatively small weight is supported by a rear portion of the work vehicle. This enables a work vehicle suitable for work travel with a work device having a relatively small weight supported by the rear portion of the work vehicle.

According to the present invention, the motor is between the front travel device and the rear travel device, and the motor hardly affects the front-back balance of the work vehicle while the work device is not supported by the work vehicle. The motor is at a relatively low position below the steering wheel in the operation section, which is advantageous in terms of allowing the work vehicle to have a lower center of gravity. This can improve the traveling stability of the work vehicle.

In the present invention, it is preferable that the work vehicle further includes a left body frame and a right body frame extending in a front-back direction below the operation section, wherein the motor is between the left body frame and the right body frame in a plan view.

There are cases where left and right body frames of a work vehicle extend in the front-back direction below the operation section.

According to the present invention, the motor is between the left and right body frames and protected by the left and right and body frames. This is advantageous in terms of preventing damage to the motor because it is possible to reduce the number of pebbles or the like that are bounced off during work travel and hit the motor.

A work vehicle of the present invention includes: at least one travel device including a front travel device; a battery; a motor; an inverter configured to operate the motor; an operation section including an operator seat; a transmission case housing a transmission for travel; and a transmission shaft, wherein the motor is above the front travel device or forward of the front travel device in a side view, and the motor, the transmission shaft, the transmission, and the travel device are configured such that motive power from the motor is transmitted to the transmission via the transmission shaft and transmitted from the transmission to the travel device.

According to the present invention, the motor is relatively far forward from the center of the work vehicle in the front-back direction. This makes it easier for the motor to function as a balance weight with a work device having a relatively large weight supported by a rear portion of the work vehicle. This enables a work vehicle suitable for work travel with a work device having a relatively large weight supported by the rear portion of the work vehicle.

According to the present invention, outside air is more likely to hit the motor while the work vehicle moves forward, which is advantageous in terms of cooling the motor.

A work vehicle of the present invention includes: a travel device; a battery; a motor; an inverter configured to operate the motor; an operation section including an operator seat; and a transmission case housing a transmission for travel, wherein the transmission case is below the operator seat, the motor is between the operator seat and the transmission case in a side view, and the motor, the transmission, and the travel device are configured such that motive power from the motor is transmitted to the transmission and transmitted from the transmission to the travel device.

According to the present invention, the motor is located relatively far rearward from the center of the work vehicle in the front-back direction. This makes it easier for the motor to function as a balance weight while a work device having a relatively large weight is supported by a front portion of the work vehicle. This enables a work vehicle suitable for work travel with a work device having a relatively large weight supported by the front portion of the work vehicle.

In a work vehicle, if the transmission case is below the operator seat in the operation section, a relatively large space is likely to be created between the operator seat and the transmission case.

According to the present invention, the motor can be relatively easily provided with effective use of the space between the operator seat and the transmission case, and the support structure for the motor can be configured relatively easily, thus simplifying the support structure for the motor.

According to the present invention, the motor is at a position close to the transmission case, and the system for transmission (transmission shaft, transmission mechanism etc.) from the motor to the transmission in the transmission case can be configured compactly. This enables simplification and weight reduction of the system for transmission from the motor to the transmission in the transmission case.

According to the present invention, work on the motor can be easily performed by, for example, removing the operator seat, thus improving the maintainability of the motor.

In the present invention, it is preferable that the work vehicle further includes: a work device; a link mechanism disposed on the transmission case, configured to be raised and lowered, and joined to the work device; a hydraulic cylinder disposed on the transmission case and configured to raise and lower the link mechanism; a hydraulic pump configured to supply hydraulic oil to the hydraulic cylinder; and a pump motor configured to drive the hydraulic pump, wherein the transmission case is below the operator seat, and the pump motor is between the operator seat and the transmission case in a side view.

In a work vehicle, there are cases where a link mechanism is disposed on the transmission case such that the link mechanism can be raised and lowered, and a hydraulic cylinder for raising and lowering the link mechanism and a hydraulic pump for supplying hydraulic oil to the hydraulic cylinder are disposed on the transmission case. With this, the work device can be joined to the link mechanism and raised and lowered by raising and lowering the link mechanism with use of the hydraulic cylinder.

The hydraulic cylinder and the hydraulic pump are provided in the transmission case in order to supply lubricating oil stored in the transmission case as hydraulic oil to the hydraulic pump, then supply the hydraulic oil from the hydraulic pump to the hydraulic cylinder, and return the hydraulic oil from the hydraulic cylinder to the transmission case.

In a work vehicle, if the transmission case is below the operator seat in the operation section, a relatively large space is likely to be created between the operator seat and the transmission case.

According to the invention, if a pump motor for driving a hydraulic pump is provided, the pump motor can be relatively easily provided with effective use of the space between the operator seat and the transmission case, and the support structure for the pump motor can be configured relatively easily, thus simplifying the support structure for the pump motor.

According to the present invention, the pump motor is between the operator seat and the transmission case, and thus the pump motor is near the hydraulic pump. This can simplify the structure for driving the hydraulic pump with use of the pump motor.

According to the present invention, work on the pump motor can be easily performed by, for example, removing the operator seat, thus improving the maintainability of the pump motor.

In the present invention, it is preferable that the work vehicle further includes: a work device; a link mechanism disposed on the transmission case, configured to be raised and lowered, and joined to the work device; and a work motor configured to supply motive power to the work device, wherein the work motor is in the link mechanism.

In a work vehicle, there are cases where a link mechanism is provided on the transmission case such that the link mechanism can be raised and lowered, and there are cases where a work vehicle is configured such that the work device is joined to the link mechanism and raised and lowered.

According to the present invention, the work motor is provided in the link mechanism, and motive power from the work motor can be supplied to the work device joined to the link mechanism. In this case, the work motor is disposed at a position close to the work device, thus enabling a short and simple configuration of the system for transmission from the work motor to the work device.

DESCRIPTION OF THE INVENTION

FIGS. 1 to 8 show electric tractors, each of which is an example of a work vehicle. In FIGS. 1 to 8, F indicates the forward direction, B indicates the rearward direction, U indicates the upward direction, D indicates the downward direction, R indicates the rightward direction, and L indicates the leftward direction.

Overall Configuration of Tractor

Figure 1:
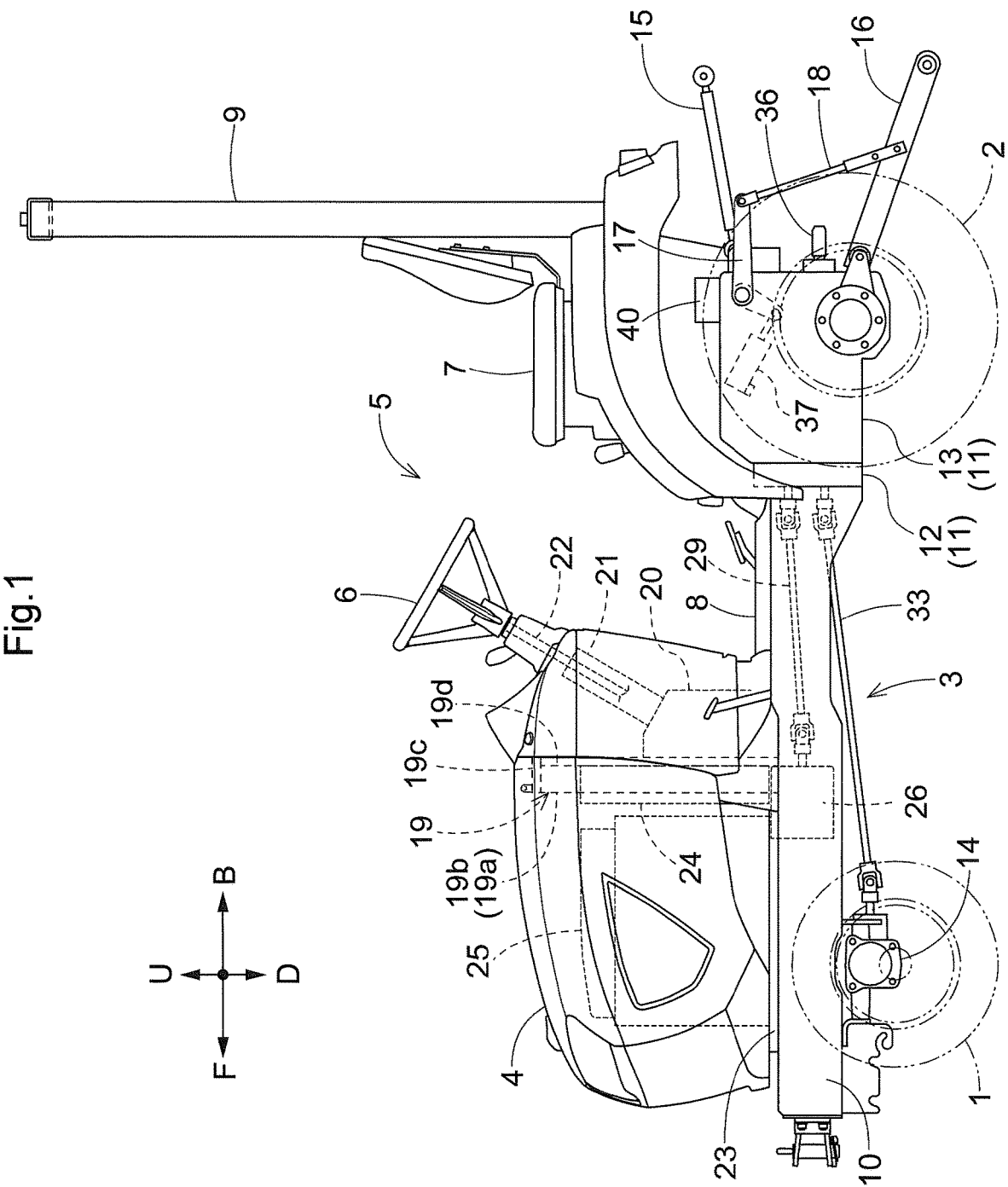
FIG. 1 is a left side view of a tractor.

As shown in FIG. 1, left and right front wheels 1 (each of which corresponds to a front travel device) and left and right rear wheels 2 (each of which corresponds to a rear travel device) support a body 3 of the tractor. A hood 4 is provided at a front portion of the body 3, and an operation section 5 is provided at a rear portion of the body 3. The operation section 5 includes a steering wheel 6 for steering the front wheels 1, an operator seat 7, a floor 8, and a ROPS frame 9.

The body 3 has left and right body frames 10, a transmission case 11, and so on. The transmission case 11 has a front case 12 and a rear case 13 that are joined to each other. The left and right body frames 10 are connected to the transmission case 11 and extend in the front-back direction below the operation section 5 (floor 8). The transmission case 11 is located below the operator seat 7 in the operation section 5.

A front axle case 14 is supported by front portions of the body frames 10, and supports the left and right front wheels 1. The transmission case 11 (rear case 13) supports the left and right rear wheels 2.

A top link 15 (which corresponds to a link mechanism) and left and right lower links 16 (each of which corresponds to a link mechanism) are provided at a rear portion of the transmission case 11 (rear case 13) in such a manner as to be swingable in the up-down direction. The top link 15 and the lower links 16 can be joined to a work device (not shown), such as a rotary cultivator.

Left and right lift arms 17 are provided at the rear portion of the transmission case 11 (rear case 13), and a connecting rod 18 is connected to the lift arms 17 and the lower links 16. The top link 15 and the lower links 16 are raised and lowered and the work device is raised and lowered by swinging the lift arms 17 in the up-down direction.

Configuration of Front Portion of Body

Figure 2:
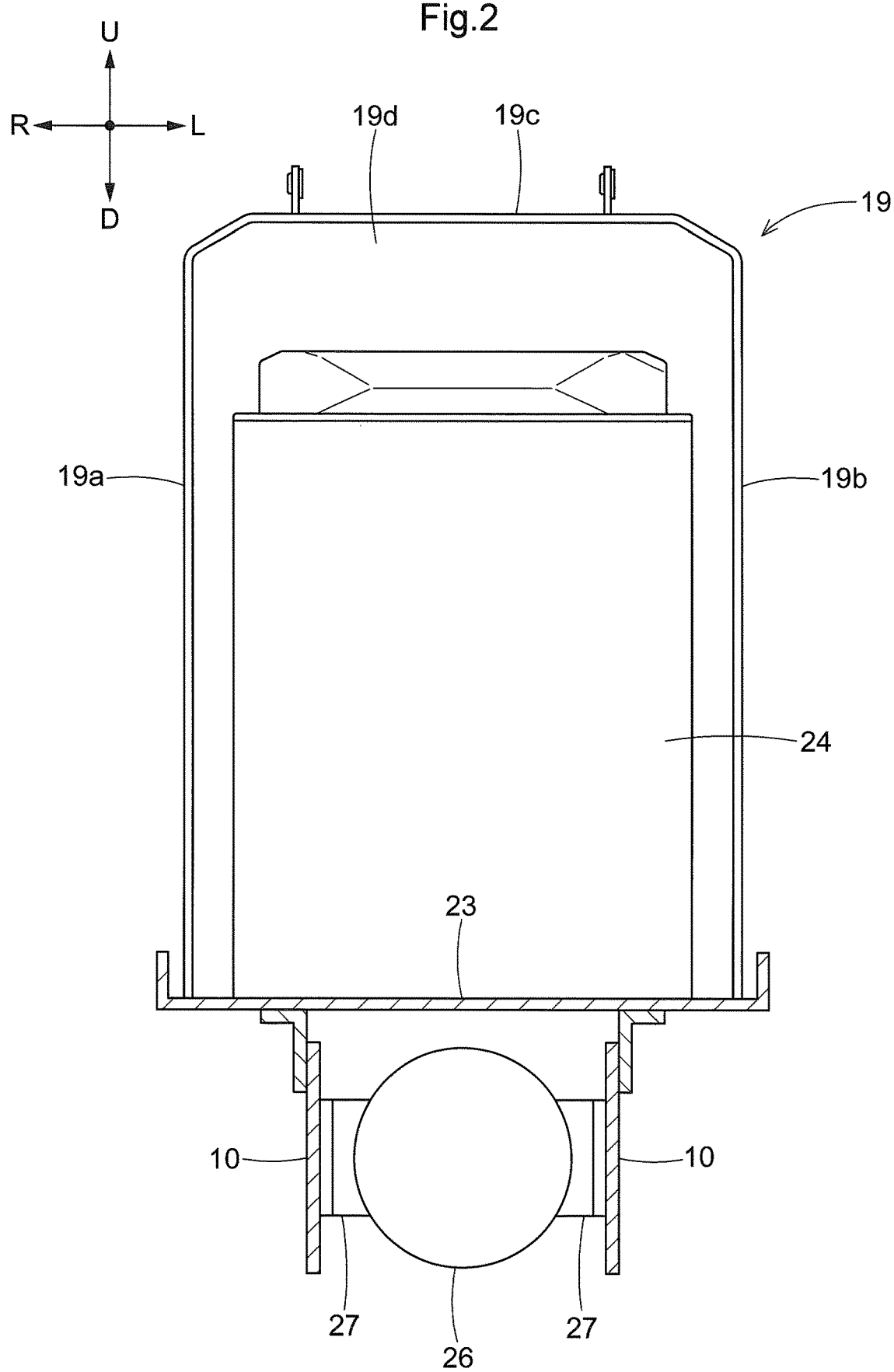
FIG. 2 is a longitudinal front view of a region around an inverter and a motor.

As shown in FIGS. 1 and 2, a pillar frame 19 is provided on the body frames 10 between the front wheels 1 and the operation section 5 (rear wheels 2). The pillar frame 19 is constituted by a folded plate material and has a right section 19*a*, a left section 19*b*, an upper section 19*c*, and a rear section 19*d*.

The rear section 19*d* of the pillar frame 19 is flat and extends in the up-down direction and the left-right direction. The right section 19*a* of the pillar frame 19 is formed by bending forward a right portion of the rear section 19*d* of the pillar frame 19, and extends in the up-down direction and the front-back direction. The left section 19*b* of the pillar frame 19 is formed by bending forward a left portion of the rear section 19*d* of the pillar frame 19, and extends in the up-down direction and the front-back direction.

The upper section 19*c* of the pillar frame 19 is formed by bending forward an upper portion of the rear section 19*d* of the pillar frame 19, and extends in the left-right direction and the front-back direction. The upper section 19*c* of the pillar frame 19 extends between upper portions of the right section 19*a* and the left section 19*b* of the pillar frame 19.

As shown in FIG. 1, the hood 4 is supported such that the hood 4 is openable and closable about a fulcrum in the left-right direction of the upper section 19*c* of the pillar frame 19, and can be operated from a closed position shown in FIG. 1 to an open position above the closed position.

A power steering mechanism 20 is provided below a rear face portion of the rear section 19*d* of the pillar frame 19. A steering post 21 is attached to the power steering mechanism 20 and extends upward from the power steering mechanism 20. A steering wheel 6 is supported by an upper portion of the steering post 21, and a steering shaft 22 is connected to the steering wheel 6 and the power steering mechanism 20.

In response to the steering wheel 6 being rotated, the rotation of the steering wheel 6 is transmitted to the power steering mechanism 20 via the steering shaft 22, and the power steering mechanism 20 steers the front wheels 1 to the left and right.

With the above configuration, the steering wheel 6 for operating the front wheels 1 (front travel devices) is provided at a front portion of the operation section 5, and the steering shaft 22 for operating the front wheels 1 (front travel devices) extends downward from the steering wheel 6, as shown in FIG. 1.

Configuration Related to Battery and Inverter

A support platform 23 is attached to front upper portions of the left and right body frames 10, as shown in FIGS. 1 and 2. An inverter 24, which is provided on the support platform 23, has a rectangular case with a small dimension (dimension in the front-back direction) that houses various types of equipment.

The inverter 24 extends in the up-down direction in a side view and extends in the left-right direction in a plan view (front view), and is attached to a rear portion of the support platform 23 so as to be in contact with a front face portion of the rear section 19*d* of the pillar frame 19.

As shown in FIG. 1, the tractor has a battery 25, which is constituted by multiple pairs of stacks (not shown) of connected battery modules (not shown) that are housed in a rectangular-parallelepiped case. The battery 25 is attached to the support platform 23, and the hood 4 at the closed position covers the inverter 24 and the battery 25. Maintenance work for the inverter 24 and the battery 25 can be performed by opening the hood 4.

With the above configuration, the inverter 24 is provided between the right section 19*a* and the left section 19*b* of the pillar frame 19 in a front view and overlaps the right section 19*a* and the left section 19*b* of the pillar frame 19 in a side view, as shown in FIGS. 1 and 2. The inverter 24 is provided below the upper section 19*c* of the pillar frame 19 in a front view and overlaps the upper section 19*c* of the pillar frame 19 in a plan view.

The battery 25 is provided forward of the operation section 5, and the inverter 24 is provided between the battery 25 and the operation section 5 in a side view. The inverter 24 is provided between the battery 25 and the steering shaft 22 in a side view.

The pillar frame 19 is provided between the battery 25 and the operation section 5 in a side view, and the inverter 24 is provided between the battery 25 and the rear section 19*d* of the pillar frame 19 in a side view.

Configuration Related to Motor

Left and right mounting brackets 27 are joined to inner faces of the left and right body frames 10, and left and right portions of a motor 26 are joined to the left and right mounting brackets 27, as shown in FIGS. 1 and 2.

Figure 3:
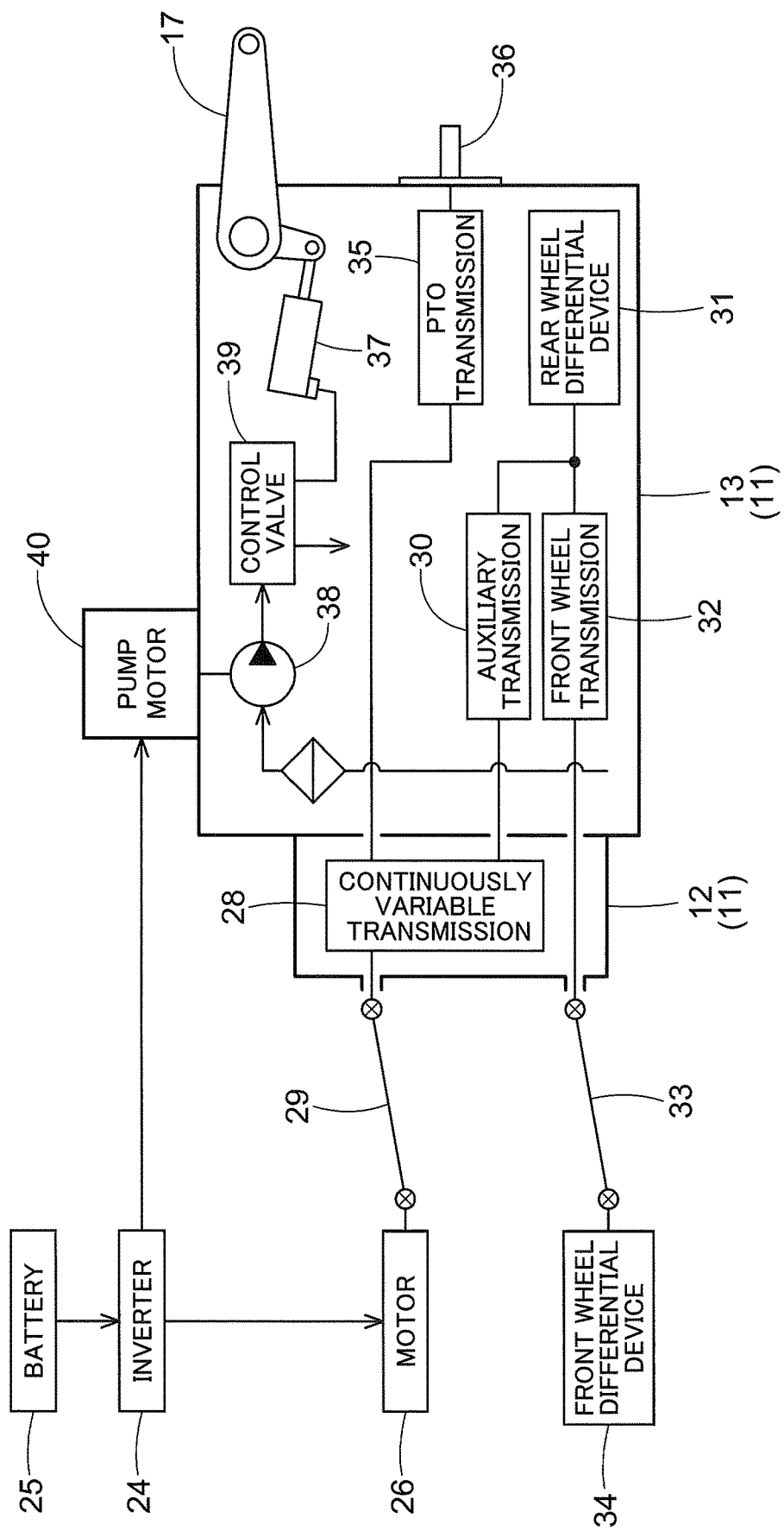
FIG. 3 schematically shows a system for transmission from the motor to front and rear wheels.

The inverter 24 converts DC power from the battery 25 to AC power and supplies the AC power to the motor 26 to operate the motor 26. Motive power from the motor 26 is supplied to the front wheels 1 and the rear wheels 2, as shown in FIG. 3.

With the above configuration, the motor 26 is provided between the front wheels 1 (front travel devices) and the rear wheels 2 (rear travel devices) and below the steering wheel 6 in a side view, as shown in FIGS. 1 and 2.

The left body frame 10 and the right body frame 10 are disposed in the front-back direction below the operation section 5 (floor 8), and the motor 26 is provided between the left body frame 10 and the right body frame 10 in a plan view (front view).

The motor 26 is provided below the pillar frame 19, the power steering mechanism 20, the inverter 24, and the rear portion of the battery 25 in a side view. The pillar frame 19, the power steering mechanism 20, and the inverter 24 are provided above the motor 26 in a side view.

Configuration of System for Transmission to Front Wheels and Rear Wheels

A hydrostatic continuously variable transmission 28 (which corresponds to a transmission for travel) is housed within the front case 12 of the transmission case 11, and motive power from the motor 26 is transmitted via a transmission shaft 29 to the continuously variable transmission 28, as shown in FIGS. 1 and 3. The continuously variable transmission 28 is capable of steplessly changing forward and backward and is operated by a gearshift pedal (not shown) on the floor 8 of the operation section 5.

An auxiliary transmission 30 (which corresponds to a transmission for travel), a rear wheel differential device 31, and a front wheel transmission 32 (which corresponds to a transmission for travel) are housed within the rear case 13 of the transmission case 11. Motive power subjected to speed change by the continuously variable transmission 28 is transmitted to the auxiliary transmission 30, and is then transmitted from the auxiliary transmission 30 to the rear wheels 2 via the rear wheel differential device 31.

Motive power diverted from between the auxiliary transmission 30 and the rear wheel differential device 31 is transmitted to the front wheel transmission 32, then transmitted from the front wheel transmission 32 via the transmission shaft 33 to the front wheel differential device 34 housed within the front axle case 14, and is transmitted from the front wheel differential device 34 to the front wheels 1.

The front wheel transmission 32 drives the front wheels 1 and the rear wheels 2 at the same speed while the front wheels 1 are operated within the range of left and right set angles from a straight-ahead position. The front wheel transmission 32 drives the front wheels 1 at a higher speed than the rear wheels 2 while the front wheels 1 are steered leftward or rightward beyond the left and right setting angles.

With the above configuration, the tractor has the transmission case 11 (front case 12 and rear case 13) that houses the continuously variable transmission 28 (transmission for travel), the auxiliary transmission 30 (transmission for travel), and the front wheel transmission 32 (transmission for travel), as shown in FIG. 3.

Motive power from the motor 26 is transmitted via the transmission shaft 29 to the continuously variable transmission 28 (transmission for travel), the auxiliary transmission 30 (transmission for travel), and the front wheel transmission 32 (transmission for travel), and is then transmitted from the continuously variable transmission 28 (transmission for travel), the auxiliary transmission 30 (transmission for travel), and the front wheel transmission 32 (transmission for travel) to the front wheels 1 (travel devices) and the rear wheels 2 (travel devices).

Configuration of System for Transmission to Work Device Joined to Top Link and Lower Links A PTO transmission 35 is housed within the rear case 13 of the transmission case 11, and a PTO shaft 36 is provided at a rear portion of the rear case 13 of the transmission case 11, as shown in FIGS. 1 and 3. A transmission shaft (not shown) is connected to the PTO shaft 36 and the work device in response to the work device being joined to the top link 15 and the lower links 16.

While motive power from the motor 26 is transmitted to the continuously variable transmission 28 via the transmission shaft 29, motive power from the transmission shaft 29 (motive power that is not subjected to speed change by the continuously variable transmission 28) is transmitted to the PTO transmission 35, and motive power subjected to speed change by the PTO transmission 35 is transmitted to the PTO shaft 36 and then transmitted from the PTO shaft 36 to the work device.

Configuration Related to Lifting Operation of Lift Arm

A single-acting hydraulic cylinder 37 is provided above the rear portion of the transmission case 11 (rear case 13), and the hydraulic cylinder 37 raises and lowers the lift arm 17, as shown in FIG. 3.

A hydraulic pump 38 and a control valve 39 are provided within the rear portion of the transmission case 11 (rear case 13). Lubricating oil that serves as hydraulic oil and stored in the transmission case 11 (rear case 13) is supplied to the hydraulic pump 38, and is then supplied from the hydraulic pump 38 to the control valve 39.

A pump motor 40 is provided above the rear portion of the transmission case 11 (rear case 13) and drives the hydraulic pump 38. The inverter 24 converts DC power from the battery 25 to AC power and supplies the AC power to the pump motor 40 to operate the pump motor 40.

Operations to supply and discharge the hydraulic oil to and from the hydraulic cylinder 37 are performed from the control valve 39, and the hydraulic cylinder 37 raises and lowers the lift arm 17. The hydraulic oil discharged from the hydraulic cylinder 37 is returned from control valve 39 to the transmission case 11 (rear case 13).

With the above configuration, the hydraulic cylinder 37, which raises and lowers the top link 15 (link mechanism) and the lower links 16 (link mechanism) to which the work device is joined, and the hydraulic pump 38, which supplies the hydraulic oil to the hydraulic cylinder 37, are provided in the transmission case 11 (rear case 13), as shown in FIGS. 1 and 3.

The pump motor 40, which drives the hydraulic pump 38, is located between the operator seat 7 in the operation section 5 and the transmission case 11 (rear case 13) in a side view.

First Variation of Implementation of the Invention

In the configuration shown in FIGS. 1 and 2, the motor 26 may be joined to the support platform 23 and supported by the body 3. The motor 26 may be joined to the pillar frame 19 and supported by the body 3.

Figure 7:
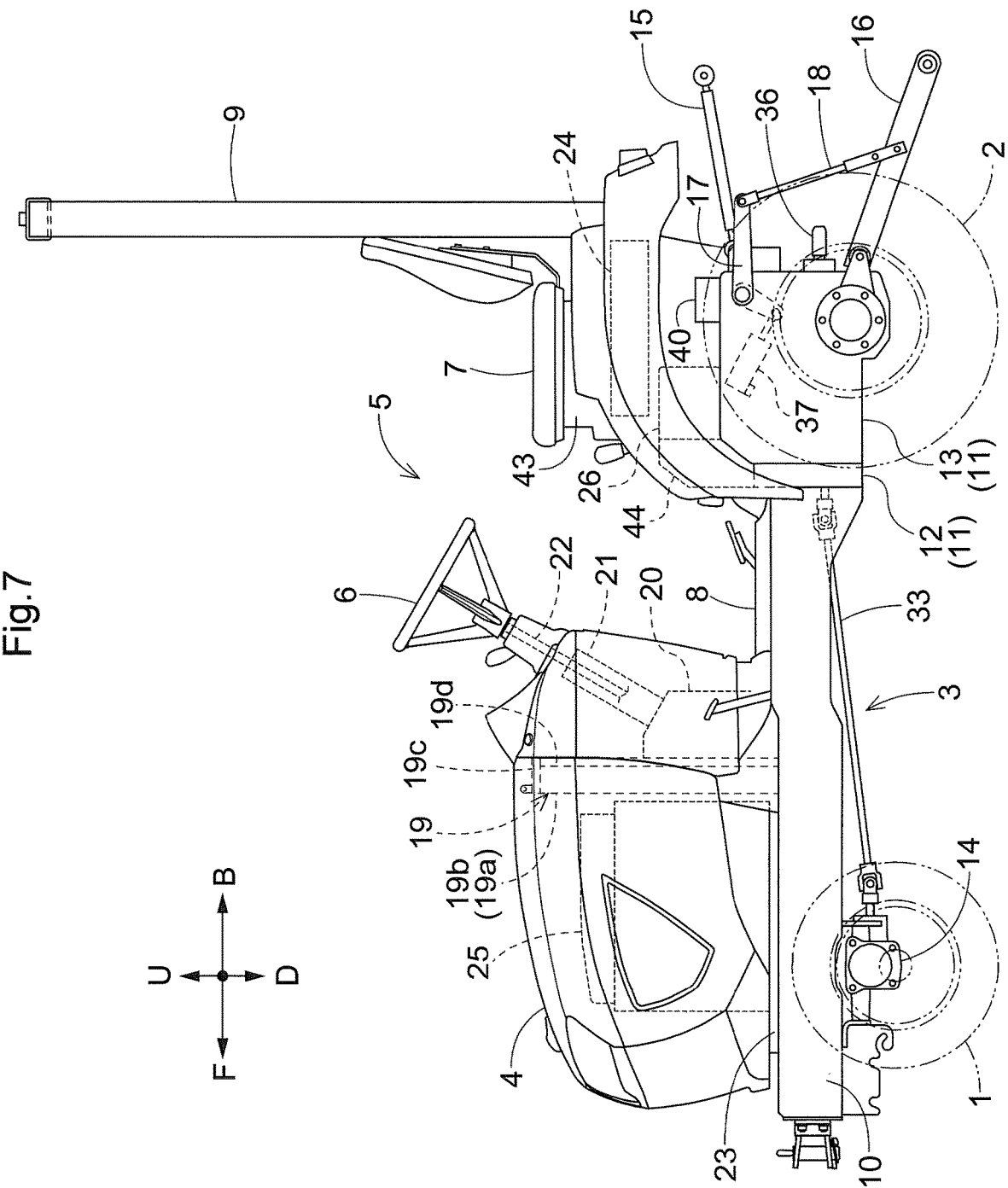
FIG. 7 is a left side view of the tractor according to the fifth variation of implementation of the present invention.

In the configuration shown in FIGS. 1 and 2, the inverter 24 may be joined to the pillar frame 19 and supported by the body 3. The inverter 24 may be provided between the operator seat 7 in the operation section 5 and the transmission case 11 (front case 12 and rear case 13) in a side view, as shown in FIG. 7, which will be described later.

Second Variation of Implementation of the Invention

Figure 4:
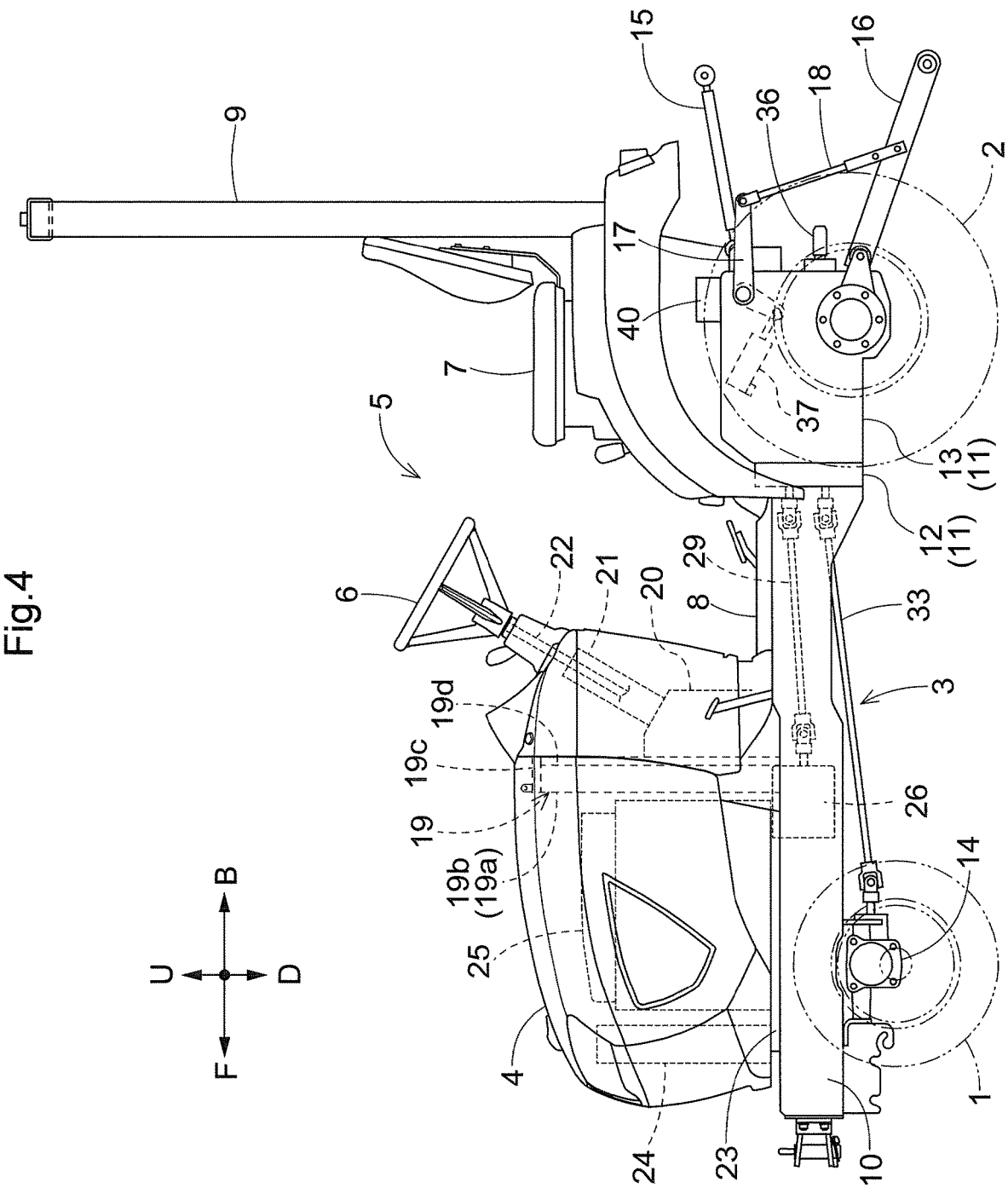
FIG. 4 is a left side view of a tractor according to a second variation of implementation of the present invention.

If the battery 25 is provided forward of the operation section 5 as shown in FIG. 4, the inverter 24 may be provided forward of the battery 25.

According to the configuration shown in FIG. 4, the inverter 24 extends in the up-down direction in a side view and extends in the left-right direction in a plan view (front view), and is provided between a front portion of the hood 4 and a front portion of the battery 25.

Third Variation of Implementation of the Invention

Figure 5:
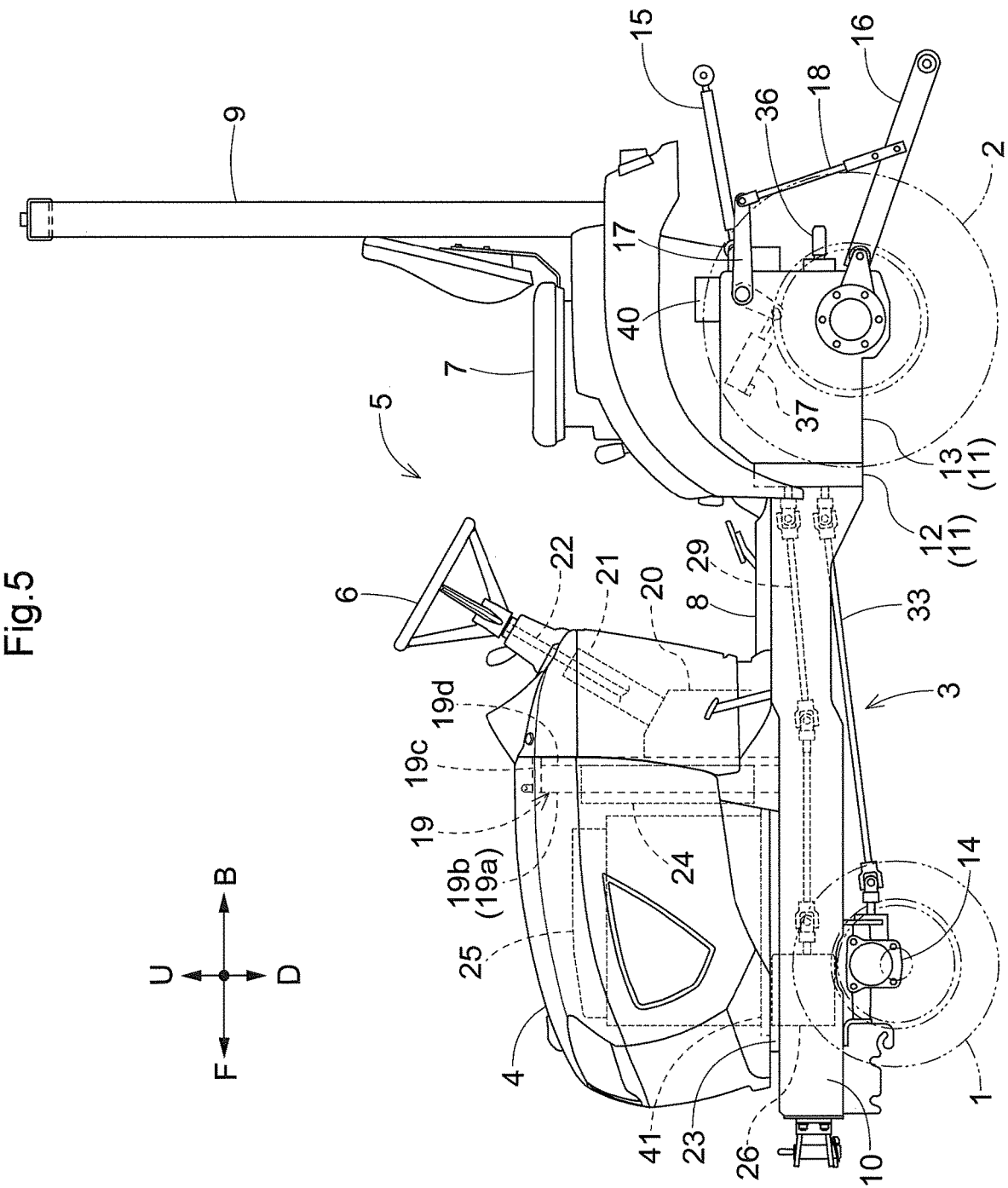
FIG. 5 is a left side view of a tractor according to a third variation of implementation of the present invention.

The motor 26 may be provided above the front axle case 14 (front wheels 1 (front travel devices)) in a side view, as shown in FIG. 5.

According to the configuration shown in FIG. 5, the motor 26 is provided below the front portion of the battery 25, and the position of the motor 26 is slightly higher. Thus, another support platform 41 need only be provided to the support platform 23 such that the battery 25 is attached to the support platform 41 to make the position of the battery 25 slightly higher.

In the configuration shown in FIG. 5, the motor 26 may be joined to the support platform 41 and supported by the body 3. The inverter 24 may be provided forward of the battery 25, as shown in FIG. 4. The inverter 24 may be provided between the operator seat 7 in the operation section 5 and the transmission case 11 (front case 12 and rear case 13) in a side view, as shown in FIG. 7, which will be described later.

Fourth Variation of Implementation of the Invention

Figure 6:
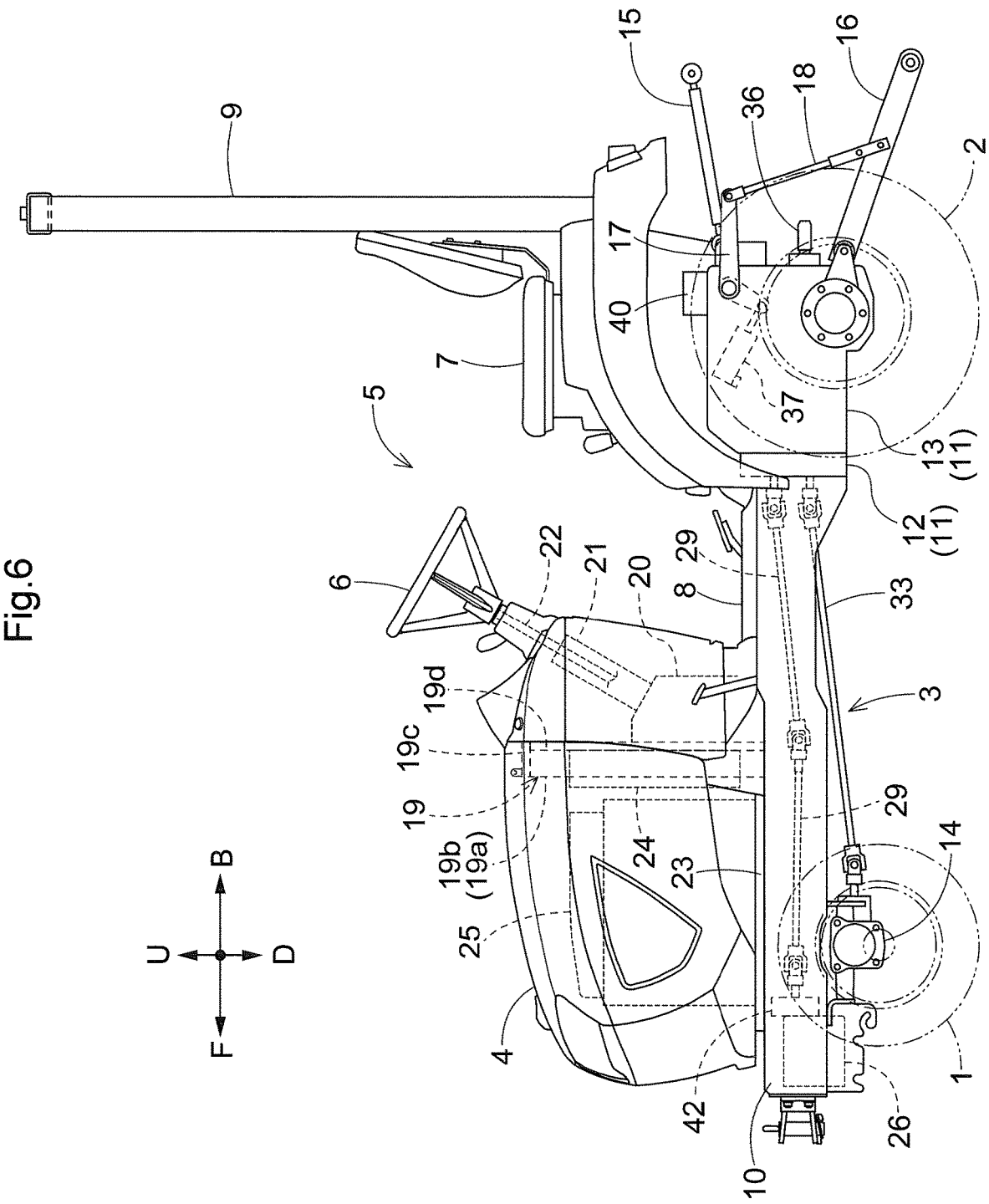
FIG. 6 is a left side view of a tractor according to a fourth variation of implementation of the present invention.

The motor 26 may be provided forward of the front axle case 14 (front wheels 1 (front travel devices)) in a side view, as shown in FIG. 6.

According to the configuration shown in FIG. 6, the motor 26 is located at a lower position. Thus, a transmission mechanism 42 of a gear transmission type need only be attached to a portion of an output shaft (not shown) of the motor 26 in such a manner as to extend upward from the motor 26. The transmission shaft 29 need only be connected to an output shaft (not shown) at an upper portion of the transmission mechanism 42 and the continuously variable transmission 28 (see FIG. 3) such that the transmission shaft 29 extends in the front-back direction above the front axle case 14.

Motive power from the output shaft of the motor 26 is transmitted to the transmission mechanism 42, then transmitted the output shaft at the upper portion of transmission mechanism 42 to the continuously variable transmission 28 (see FIG. 3) via the transmission shaft 29, and is transmitted to the front wheels 1 and the rear wheels 2.

In the configuration shown in FIG. 6, the motor 26 may be joined to the support platform 23 and supported by the body 3. The inverter 24 may be provided forward of the battery 25, as shown in FIG. 4. The inverter 24 may be provided between the operator seat 7 in the operation section 5 and the transmission case 11 (front case 12 and rear case 13) in a side view, as shown in FIG. 7, which will be described later.

Fifth Variation of Implementation of the Invention

As shown in FIG. 7, if the transmission case 11 (front case 12 and rear case 13) is provided below the operator seat 7 in the operation section 5, the motor 26 may be attached to the upper portion of the transmission case 11 (front case 12 and rear case 13) and provided between the operator seat 7 in the operation section 5 and the transmission case 11 (front case 12 and rear case 13) in a side view.

The inverter 24 may be provided between the operator seat 7 in the operation section 5 and the transmission case 11 (front case 12 and rear case 13) in a side view by attaching the inverter 24 to a support frame 43 that is provided in the operation section 5 to support the operator seat 7.

In the configuration shown in FIG. 7, the motor 26 need only be attached to the upper portion of the transmission case 11 (front case 12 and rear case 13) such that an output shaft (not shown) of the motor 26 faces forward, and a transmission mechanism 44 of a gear transmission type need only be attached to the output shaft of the motor 26 and a forward-facing input shaft (not shown) of the continuously variable transmission 28 (see FIG. 3).

Motive power from the output shaft of the motor 26 is transmitted to the transmission mechanism 44, then transmitted from an output shaft (not shown) at a lower portion of the transmission mechanism 44 to the continuously variable transmission 28 (see FIG. 3), and is transmitted to the front wheels 1 and the rear wheels 2.

In the configuration shown in FIG. 7, the inverter 24 is supported in a suspended manner by a lower portion of the support frame 43 and extends in the horizontal direction. The inverter 24 is disposed at a position upward of and away from the motor 26 and the pump motor 40, and is disposed at a position upward of and away from the upper portion of the transmission case 11 (front case 12 and rear case 13).

Sixth Variation of Implementation of the Invention

If the motor 26 is provided between the operator seat 7 in the operation section 5 and the transmission case 11 (front case 12 and rear case 13) in a side view, as shown in FIG. 7, the inverter 24 may be provided rearward of the battery 25, as shown in FIG. 1. The inverter 24 may be provided forward of the battery 25, as shown in FIG. 4.

Seventh Variation of Implementation of the Invention

Figure 8:
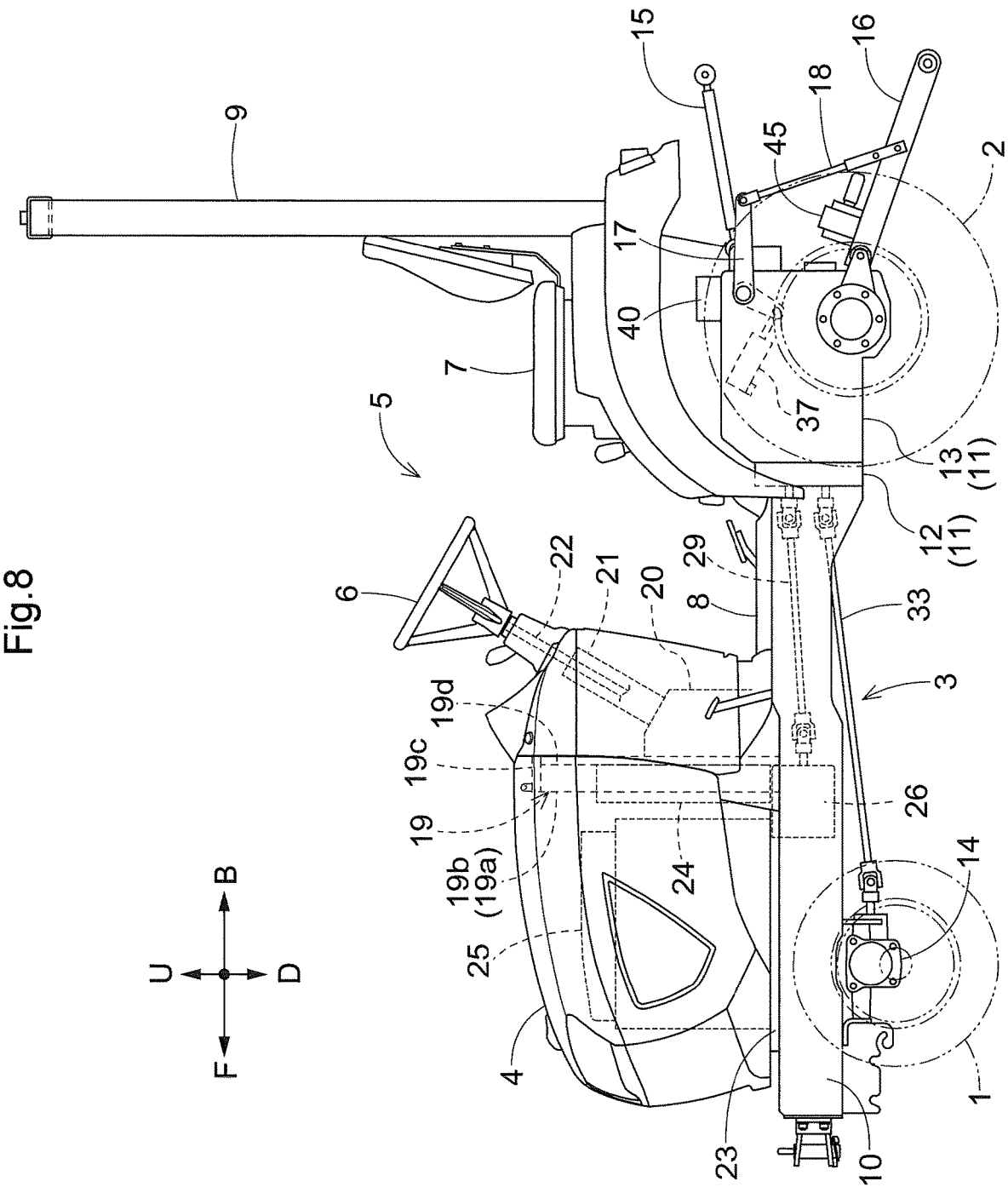
FIG. 8 is a left side view of a tractor according to a seventh variation of implementation of the invention.

A work motor 45 may be provided on the left and right lower links 16 (link mechanism), as shown in FIG. 8.

According to the configuration shown in FIG. 8, with the work device joined to the top link 15 and the lower links 16, a transmission shaft (not shown) is connected to the work motor 45 and the work device. The inverter 24 converts DC power from the battery 25 to AC power, which is supplied to the work motor 45 to operate the work motor 45, and motive power from the work motor 45 is transmitted to the work device.

In the configuration shown in FIG. 8, the PTO transmission 35 and the PTO shaft 36 shown in FIGS. 1 and 3 may be eliminated. The work motor 45 may be provided on the top link 15 (link mechanism).

Eighth Variation of Implementation of the Invention

The tractor may have a four-wheel steering structure in which the front wheels 1 and the rear wheels 2 are steered in the same and opposite phases by the steering wheel 6.

Crawler-type travel devices (not shown) may be provided instead of the front wheels 1 as the front travel devices. Crawler-type travel devices (not shown) may be provided instead of the rear wheels 2 as the rear travel devices. One crawler-type travel device (not shown) may be provided instead of the front wheels 1 and the rear wheels 2.

INDUSTRIAL APPLICABILITY

The present invention can be applied to not only electric tractors in which a motor drives a travel device, but also to hybrid tractors in which an engine and a motor drive a travel device, and can be applied to not only tractors but also construction work vehicles and agricultural work vehicles.

What is claimed is:
1. A tractor comprising:
left and right body frames;
at least one travel device comprising a front travel device;
a battery;
an electric motor;
an inverter configured to operate the motor;
an operation section comprising an operator seat;
a transmission case housing a transmission for travel;
a transmission shaft; and
left and right mounting brackets arranged, respectively, on inner faces of the left and right body frames,
wherein the electric motor is forward of the front travel device in a side view, and attached to the left and right mounting brackets,
wherein the inverter is above the electric motor, and
wherein the electric motor, the transmission shaft, the transmission, and the travel device are configured such that motive power from the electric motor is transmitted to the transmission via the transmission shaft and transmitted from the transmission to the travel device.
2. The tractor according to claim 1, further comprising:
a work device;
a link mechanism disposed on the transmission case, configured to be raised and lowered, and joined to the work device;
a hydraulic cylinder disposed on the transmission case and configured to raise and lower the link mechanism;
a hydraulic pump configured to supply hydraulic oil to the hydraulic cylinder; and
a pump motor configured to drive the hydraulic pump,
wherein the transmission case is below the operator seat, and
wherein the pump motor is between the operator seat and the transmission case in a side view.
3. The tractor according to claim 1, further comprising:
a work device;

a link mechanism disposed on the transmission case, configured to be raised and lowered, and joined to the work device; and a work motor configured to supply motive power to the work device, and wherein the work motor is in the link mechanism.

4. The tractor according to claim 1, further comprising:

a support platform attached to front upper portions of the left and right body frames, wherein the inverter is mounted on the support platform.

* * * * *